US011902849B2

(12) United States Patent
Wong et al.

(10) Patent No.: US 11,902,849 B2
(45) Date of Patent: Feb. 13, 2024

(54) METHODS AND APPARATUS FOR SUPPORTING QUALITY OF SERVICE IN A SYSTEM INCLUDING A CABLE MODEM TERMINATION SYSTEM AND WIRELESS COMMUNICATIONS LINK

(71) Applicant: Charter Communications Operating, LLC, St. Louis, MO (US)

(72) Inventors: Curt Wong, Bellevue, WA (US); Sami Makinen, Littleton, CO (US); Parmjit Dhillon, Tampa, FL (US); Greg Mclaughlin, Denver, CO (US)

(73) Assignee: Charter Communications Operating, LLC, St. Louis, MO (US)

( * ) Notice: Subject to any disclaimer, the term of this patent is extended or adjusted under 35 U.S.C. 154(b) by 0 days.

(21) Appl. No.: 18/123,963

(22) Filed: Mar. 20, 2023

(65) Prior Publication Data
US 2023/0232301 A1    Jul. 20, 2023

Related U.S. Application Data

(63) Continuation of application No. 15/916,096, filed on Mar. 8, 2018, now Pat. No. 11,611,923.

(51) Int. Cl.
| | |
|---|---|
| *H04W 36/30* | (2009.01) |
| *H04W 72/04* | (2023.01) |
| *H04L 41/50* | (2022.01) |
| *H04W 76/10* | (2018.01) |
| *H04W 88/02* | (2009.01) |
| *H04L 61/5007* | (2022.01) |

(52) U.S. Cl.
CPC ............. *H04W 36/30* (2013.01); *H04L 41/50* (2013.01); *H04W 72/04* (2013.01); *H04W 76/10* (2018.02); *H04L 61/5007* (2022.05); *H04W 88/02* (2013.01)

(58) Field of Classification Search
CPC ............. H04W 12/08; H04W 36/0055; H04W 36/0066; H04W 36/14; H04W 48/18; H04W 60/04; H04W 76/12; H04W 76/32; H04W 84/045; H04W 8/16; H04W 92/12
See application file for complete search history.

(56) References Cited

U.S. PATENT DOCUMENTS

| | | | |
|---|---|---|---|
| 7,748,002 B1 * | 6/2010 | Beser ................. | H04L 12/2801 718/104 |
| 2006/0104203 A1 * | 5/2006 | Krantz ............. | H04M 15/8016 370/230 |

* cited by examiner

*Primary Examiner* — Natasha W Cosme
(74) *Attorney, Agent, or Firm* — Straub & Straub; Michael P. Straub; Stephen T. Straub

(57) ABSTRACT

A cable communications network provides an alternative communications path between a user equipment device and a data network to a cellular path for a communications session with a desired level of Quality of Service. A cable modem termination system, coupled to a wireless core network, e.g., a 5G core network, interacts with the wireless core network to attempt to establish a PDU session for a UE with a desired QoS level. The core sends a QoS service request message to the CMTS including a requested level of QoS, an IP address and port number for the session. The CMTS and cable modem, corresponding to the UE, negotiate and decide if the request desired QoS level can be supported over the cable between the CMTS and the cable mode for the session.

20 Claims, 11 Drawing Sheets

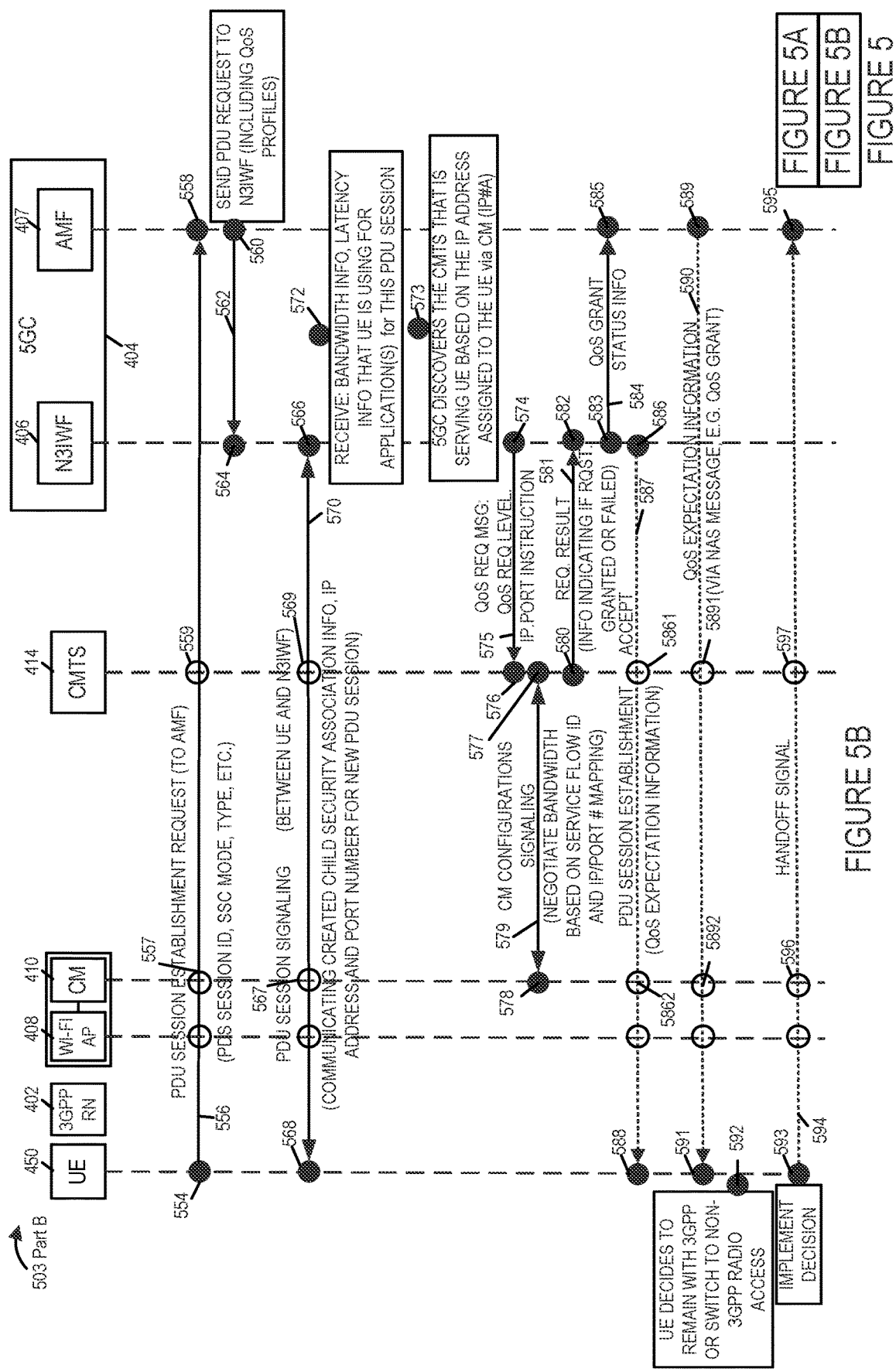

800

ASSEMBLY OF COMPONENTS

804 — COMPONENT CONFIGURED TO OPERATE THE CMTS TO COMMUNICATE A PDU SESSION ESTABLISHMENT REQUEST FROM A UE TO A WIRELESS NETWORK CORE TO ESTABLISH A NEW PDU SESSION FOR THE UE

806 — COMPONENT CONFIGURED TO OPERATE THE CMTS TO COMMUNICATE PDU SESSION SIGNALING BETWEEN THE UE AND THE WIRELESS NETWORK CORE, SAID SIGNALING COMMUNICATING CHILD SECURITY ASSOCIATION INFORMATION FOR THE NEW PDU SESSION ALONG WITH AN IP ADDRESS AND PORT NUMBER TO BE USED FOR THE NEW PDU SESSION

808 — COMPONENT CONFIGURED TO CONTROL A RECEIVER TO RECEIVE, AT A CABLE MODE TERMINATION SYSTEM (CMTS) A QUALITY OF SERVICE (QoS) REQUEST REQUESTING A DESIRED LEVEL FOR QoS FOR A PROTOCOL DATA UNIT (PDU) SESSION FOR A USER EQUIPMENT (UE) DEVICE, SAID QoS REQUEST INCLUDING AN IP ADDRESS AND PORT NUMBER USED FOR COMMUNICATING WITH THE UE VIA A CABLE MODEM AND THE CMTS

810 — COMPONENT CONFIGURED TO OPERATE THE CMTS TO NEGOTIATE WITH THE CABLE MODEM TO DETERMINE IF THE REQUEST QoS CAN BE SUPPORTED

812 — COMPONENT CONFIGURED TO SEND FROM THE CMTS A QoS REQUEST RESULT MESSAGE COMMUNICATING TO A WIRELESS NETWORK CORE A RESPONSE TO THE QoS REQUEST

814 — COMPONENT CONFIGURED TO OPERATE THE CMTS TO COMMUNICATE A PDU SESSION ESTABLISHMENT ACCEPT SIGNAL SENT BY THE WIRELESS CORE TO THE UE VIA THE CABLE MODEM AS PART OF ESTABLISHING THE PDU SESSION

816 — COMPONENT CONFIGURED TO OPERATE THE CMTS TO COMMUNICATE QoS EXPECTATION INFORMATION, SENT BY THE WIRELESS CORE, TO THE UE VIA THE CABLE MODEM

822 — COMPONENT CONFIGURED TO OPERATE THE CMTS TO COMMUNICATE A HANDOFF SIGNAL FROM THE UE TO THE WIRELESS CORE, SAID HANDOFF SIGNAL INDICATING A DECISION BY THE UE TO HANDOFF TO SAID PDU SESSION

824 — COMPONENT CONFIGURED TO OPERATE THE CMTS TO COMMUNICATE PACKETS FOR THE PDU SESSION, SAID COMMUNICATED PACKETS BEING COMMUNICATED BETWEEN THE CM AND THE CMTS IN ACCORDANCE WITH THE COMMUNICATED QoS EXPECTATION INFORMATION

FIGURE 8

METHODS AND APPARATUS FOR SUPPORTING QUALITY OF SERVICE IN A SYSTEM INCLUDING A CABLE MODEM TERMINATION SYSTEM AND WIRELESS COMMUNICATIONS LINK

RELATED APPLICATIONS

The present application is a continuation of U.S. patent application Ser. No. 15/916,096 filed Mar. 8, 2018 which was Published on Sep. 12, 2019 as Publication No.: US 2019-0281522 A1 and which is hereby expressly incorporated by reference in its entirety.

FIELD

The present invention relates to communication methods and apparatus, and more particularly, to methods and apparatus for supporting and/or providing desired levels of Quality of Service for protocol data unit (PDU) sessions where the communications path traverses a cable modem termination system (CMTS) in addition to a wireless link.

BACKGROUND

3GPP 5G promises new capabilities, e.g., network slicing, ultra-low latency, highly scalable and cloud friends, Unified Security and Policy, mobility on demand, etc., to support a variety of business opportunities. Multiple System Operators (MSOs) are chartering into the realm of using 3GPP radio access technology to complement their existing fixed-cable assets.

In general a cable network authenticates a cable modem based on e.g., Media Access Control (MAC) address. Multiple user devices, e.g., user equipments (UE1) and UE2 which are coupled to a modem, are typically not visible in the cable network, as they are normally sharing the same IP address using network address translation (NAT) locally. Typically, the bandwidth being provided to these UEs are not differentiated and are normally based on best effort. On the other hand the cable network can provide dedicated bandwidth to support telephony service because the voice telephone line is treated like a separate cable mode with a different MAC address.

While cellular communications, e.g., 3GPP cellular, for UE devices offers different quality of service options for data sessions, cellular communications can be costly and the available wireless cellular bandwidth may be limiting factor. UE communications via a communications path including WiFi and a cable network backhaul may be less costly for a user and/or the available WiFi resources, in at least some embodiments, may not be a limiting factor. However, as described above typical cable networks are not implemented to support various options of desired QoS levels on a per session basis for a particular data flow corresponding to one of a plurality of UEs attached to the same modem.

Based on the above discussion, there is a need for new methods and apparatus to address the technical problem of how to support multiple levels of QoS for a session data flow corresponding to a UE which communications via a wireless link in combination with a link between a cable modem and cable modem termination system. It would be advantageous if at least some of these new methods and apparatus allowed for the same or similar QoS levels for a session flow when using the cable network as when using the wireless cellular network. It would also be advantageous if at least some of these new methods for improving cable network user experience reused parts and/or features of an existing cellular network.

SUMMARY

In some exemplary embodiments, in accordance with the present invention, cellular wireless core network, e.g., a 3GPP 5G core network architecture, is reused to provide the same or nearly the same quality of service experiences to a MSO subscriber regardless of whether the user is using: i) non-3GPP radio, e.g. WiFi, via fixed cable backhaul, or ii) 3GPP radio, e.g., Long Term Evolution (LTE)/New Radio (NR), with a dedicated backhaul, e.g., a dedicated backhaul over fiber. In various embodiments, a user equipment (UE) device, which may be one of a plurality of UEs attached to the same cable modem, can request on a per protocol data unit session (PDU) basis, and may be provided, the same or nearly the same level of QoS over the backhaul of the cable network, e.g. between the cable modem and the cable modem termination system (CMTS), as would be provided over the cellular network. Thus in some embodiments, a UE device may, and sometimes does switch between a cellular network path to a cable network path, e.g., using the least costly path which is currently capable of providing the desired level of QoS for a session.

In some embodiments, a cable communications network provides an alternative communications path between a user equipment device and a data network to a cellular path for a communications session with a desired level of Quality of Service. A exemplary cable modem termination system (CMTS), implemented in accordance with features of the present invention, which is coupled to a wireless core network, e.g., a 5G core network, interacts with the wireless core network to attempt to establish a PDU session for a UE with a desired QoS level. The core sends a QoS service request to the CMTS including a requested level of QoS, an IP address and port number for the session. The CMTS and cable modem corresponding to the UE negotiate and decide if the request desired QoS level can be supported over the cable between the CMTS and the cable mode for the session.

An exemplary communications method, in accordance with some embodiments comprises: receiving, at a cable mode termination system (CMTS), a QoS (Quality of Service) request requesting a desired level of QoS for a Protocol Data Unit (PDU) session for a user equipment device (UE), said QoS request including an IP address and port number used for communicating with the UE via a cable modem and said CMTS; and sending, from the CMTS, a QoS request result message communicating to a wireless network core a response to the QoS request.

An exemplary communications system, in accordance with some embodiments, includes: a cable modem termination system (CMTS) including: a receiver configured to receive, at a cable mode termination system (CMTS), a QoS (Quality of Service) request requesting a desired level of QoS for a Protocol Data Unit (PDU) session for a user equipment device (UE), said QoS request including an IP address and port number used for communicating with the UE via a cable modem and said CMTS; and a transmitter configured to send, from the CMTS, a QoS request result message communicating to a wireless network core a response to the QoS request.

While various features and methods have been described, all embodiments need not include all features or steps mentioned in the summary. Numerous additional features and embodiments are discussed in the detailed description which follows.

BRIEF DESCRIPTION OF THE FIGURES

FIG. 5B is a second part of is an exemplary signaling diagram illustrating an exemplary communications method in accordance with an exemplary embodiment.

FIG. 5 comprises the combination of FIG. 5A and FIG. 5B.

FIG. 8 is a drawing of an exemplary assembly of components which may be included in a CMTS in accordance with an exemplary embodiment.

DETAILED DESCRIPTION

Figure 1:
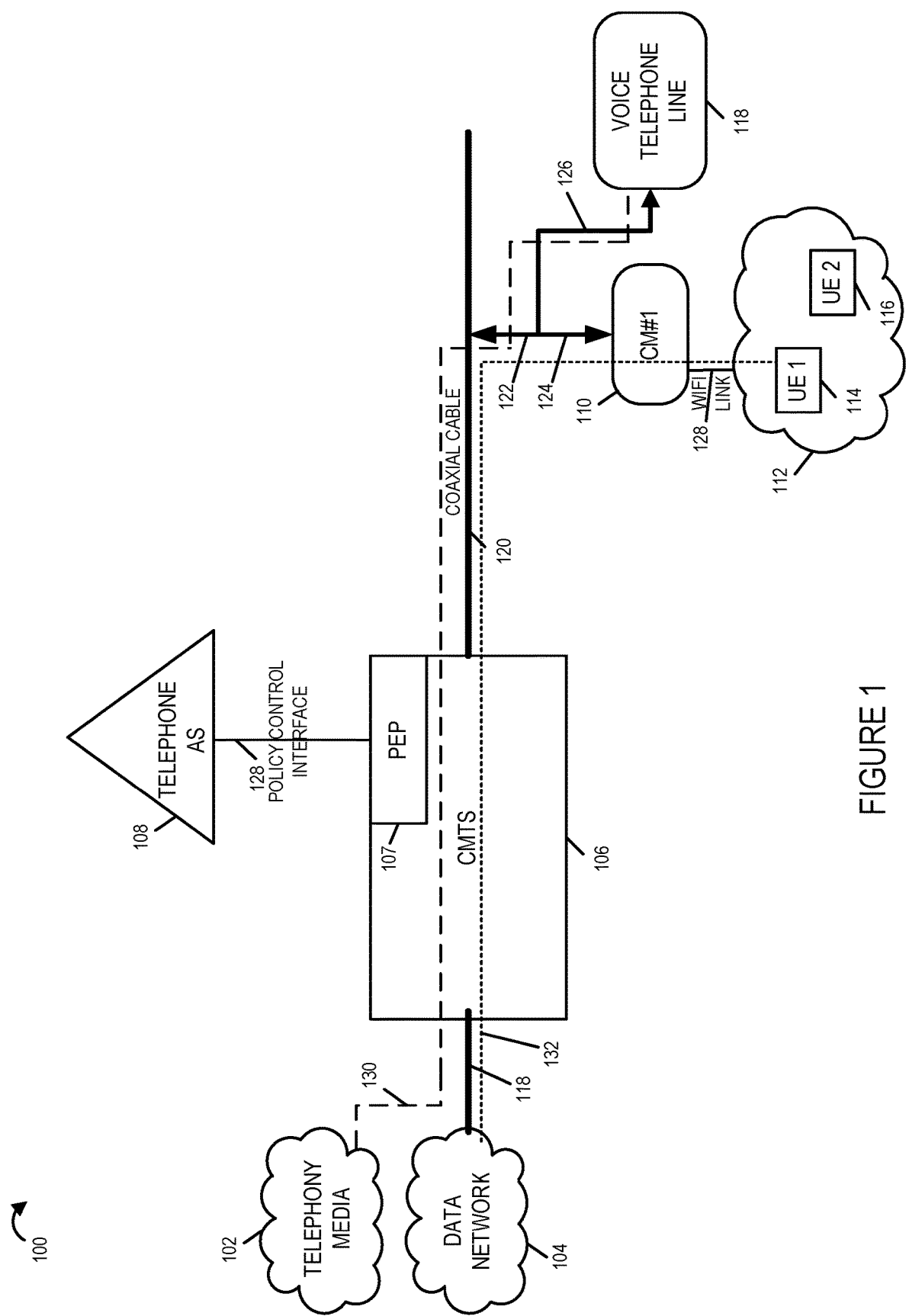
FIG. 1 is a drawing of a simplified cable network setup with dedicated bandwidth allocated for a telephone application, while other data is communicated using best effort.

FIG. 1 is a drawing of a simplified cable network setup 100 with dedicated bandwidth allocated for a telephone application, while other data is using best effort. Network setup 100 includes telephone media 102, data network 104, Cable Modem Termination system (CMTS) 106, telephone Application Server (AS) 108, Cable Modem #1 (CM#1) 110, WiFi network 112, voice telephone line 118, User Equipment 1 (UE 1) 114 and UE 2 116. CMTS 106 includes Police Enforcement Point (PEP) 107. Network setup 100 further includes coaxial cable 118, coaxial cable 120, link 122, link 124, link 126, and WiFi link 128. The telephone AS 108 is coupled to the PEP 107 via policy control interface 128. In this example, the telephone application data is communicated between telephone media 120 and voice telephone line 118, via coaxial cable 118, CMTS 106, coaxial cable 120, connection 122, and connection 126, using dedicated bandwidth allocated for the telephone application, as indicated by dashed line path 130. In this example, other data is communicated between data network 104 and UE 1 114, via coaxial cable 118, CMTS 106, coaxial cable 120, connection 122, connection 126, CM #1 110 and WiFi link 128, using best effort, as indicated by dotted line path 130.

Figure 2:
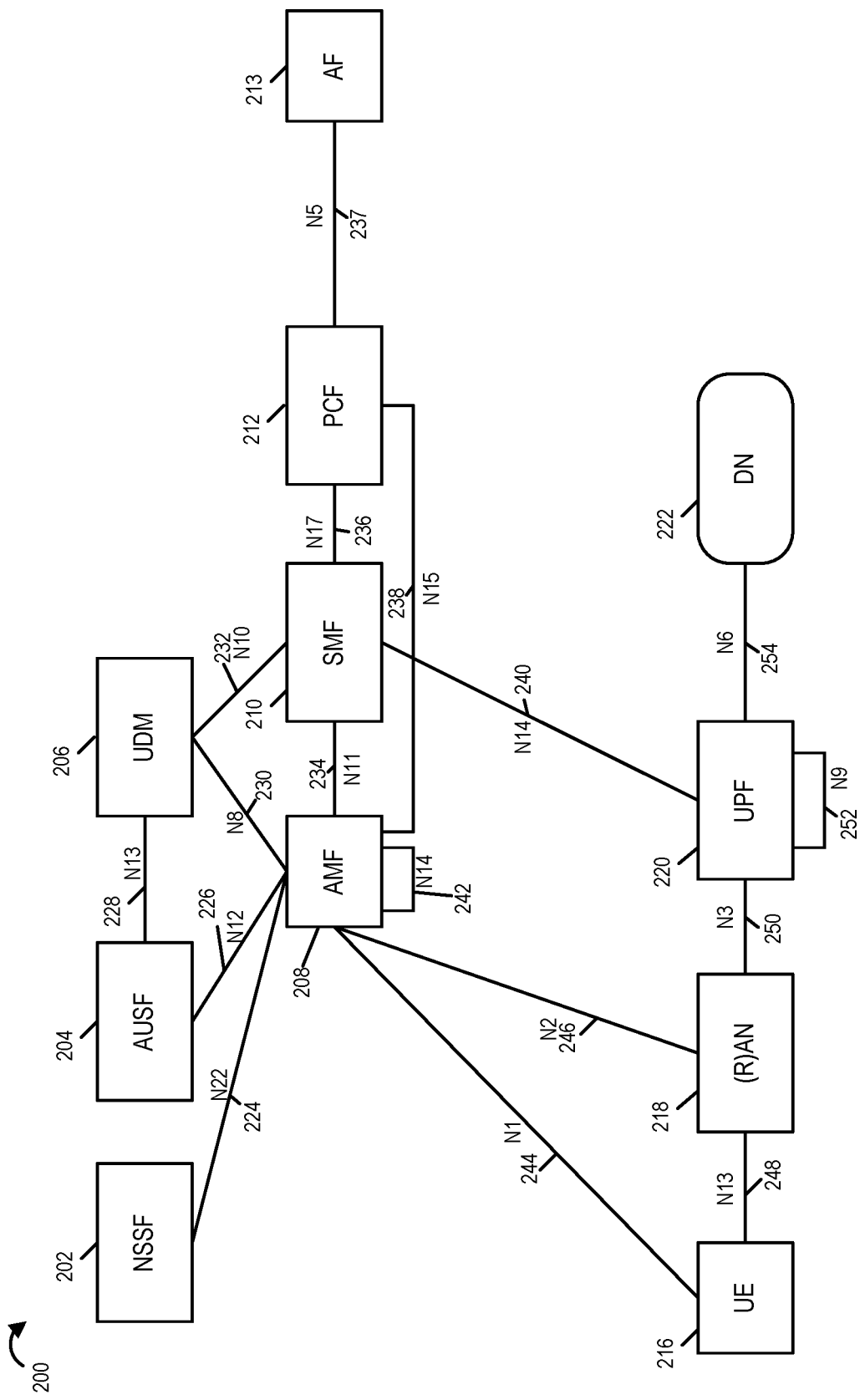
FIG. 2 is a drawing illustrating 3GPP 5G architecture in accordance with TS 23.501.

FIG. 2 is a drawing illustrating 3GPP 5G architecture 200 in accordance with TS 23.501. The 3GPP 5G architecture 200 includes a Network Slice Selection Function (NSSF) 202, an Authentication Server Function (AUSF) 204, a Unified Data Management (UDM) 206, an Access and Mobility Management Function (AMF) 108, a Session Management Function (SMF) 210, a Policy Control Function (PCF) 212, an Application Function (AF) 213, a User Equipment (UE) 216, a (Radio) Access Network ((R) AN) 218, a User Plane Function (UPF) 220 and a Data Network (DN) 222 coupled together as shown in FIG. 2. The NSSF 202 is coupled to the AMF 208 via N22 interface connection(s) 224. The AUSF 204 is coupled to the UDM 206 via N13 interface connection(s) 228. The AUSF 204 is coupled to the AMF 208 via N12 interface connection(s) 226. The UDM 206 is coupled to the AMF 208 via N8 interface connection(s) 230. The UDM 206 is coupled to SMF 210 via N10 interface connection(s) 232. AMF 208 is coupled to SMF 210 via N11 interface connection(s) 234. SMF 210 is coupled to PCF 212 via N17 interface connection(s) 236. Components within AMF 208 are coupled to other components within AMF 208 via N14 interface connection(s) 242. AMF 208 is coupled to PCF 212 via N15 interface connection(s) 238. PCF 212 is coupled to AF 213 via N5 interface connection(s) 237. UE 216 is coupled to AMF 208 via N1 interface connection(s) 244. UE 216 is coupled to (R)AN 218 via N13 interface connection(s) 248. (R)AN 218 is coupled to AMF 208 via N2 interface connection(s) 246. (R)AN 218 is coupled to UPF 220 via N3 interface connection(s) 250. UPF 220 is coupled to SMF 210 via N14 interface connection(s) 240. Components within UPF 220 are coupled to other components within UPF 220 via N9 interface connection(s) 252. UPF 220 is coupled to DN 222 via N6 interface connection(s) 254.

In 3GPP 5G system architecture as shown in FIG. 2, each UE can be differentiated by the network and for each UE, each IP flow can be allocated with specific bandwidth or traverse via a specific slice in the network, based on UE subscription profile and/or application requirements.

Figure 3:
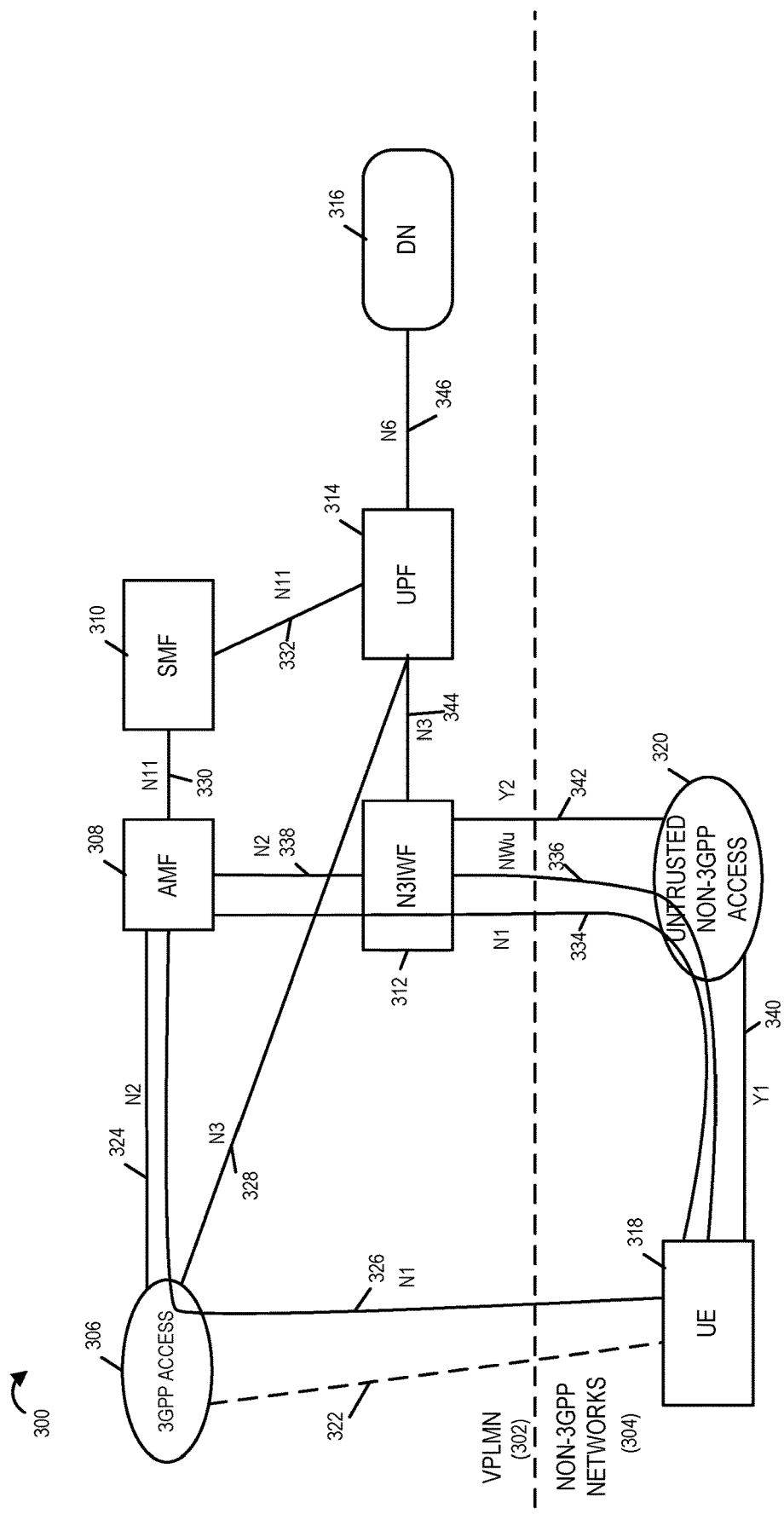
FIG. 3 is a drawing illustrating 3GPP 5G architecture in accordance with TS 23.501 for non 3GGP access.

FIG. 3 is a drawing illustrating 3GPP 5G architecture 300 in accordance with TS 23.501 for non 3GGP access. 3GPP 5G architecture 300 includes a VPLMN 302 and a non-3GPP network(s) 304. Visited Public Land Mobile Network (VPLMN) 302 includes a 3GPP access component 306, e.g., a Long Term Evolution (LTE) or New Radio (NR) wireless access point, e.g., base station, a AMF 308, a SMF 310, a Non-3GPP Interworking Function (N3IWF) 312, a UPF 314 and a DN 316. The non-3GPP network 304 includes an untrusted non-3GPP access component 320, e.g., an untrusted WiFi access point, e.g., base station. UE 318 may, and sometimes does, belong to both the VPLMN 302 and the non-3GPP network 304.

UE 318 is coupled to 3GPP access component 306 via wireless link 322. UE 318 is coupled to AMF 308 through 3GPP access component 306 via N1 interface connection(s) 326. 3GPP access component 306 is coupled to AMF 308 via N2 interface connection (s) 324. 3GPP access component 306 is coupled to UPF 314 via N3 interface connection(s) 324.

UE 318 is coupled to untrusted non-3GPP access component 320 via Y1 interface connection(s) 340. Untrusted non-3GPP access component 320 is coupled to N3IWF 312 via Y2 interface connection(s) 342. UE 318 is coupled to AMF 308, through N3IWF 312, via N1 interface connection(s) 334. UE 318 is coupled to N3IWF 312, via NWu interface connection(s) 336. N3IWF 312 is coupled to AMF 308, via N2 interface connection(s) 338.

AMF 308 is coupled to SMF 310 via N11 interface connection(s) 330. SMF 310 is coupled to UPF 314 via N11 interface connection(s) 332. UPF 314 is coupled to DN 316 via N6 interface connection(s) 346.

Note that a UE accessing 5G over Data Over Cable Service Interface Specification (Docis) can use the architecture shown in FIG. 3, via the untrusted 3GPP access. Ideally, it would be desirable if the same quality of experience (QoE) could be provided to the UE 318 regardless of which radio access, e.g., cellular or WiFi, is being used to access the same network e.g., data network 316, assuming radio link bandwidth is not the bottle neck.

However, this is not possible today for a typical Docis network because multiple UEs attached to the same cable modem are not differentiated within the typical cable network. Also without differentiation between the UEs, "slicing" cannot be extended via Docis Network.

Figure 4:
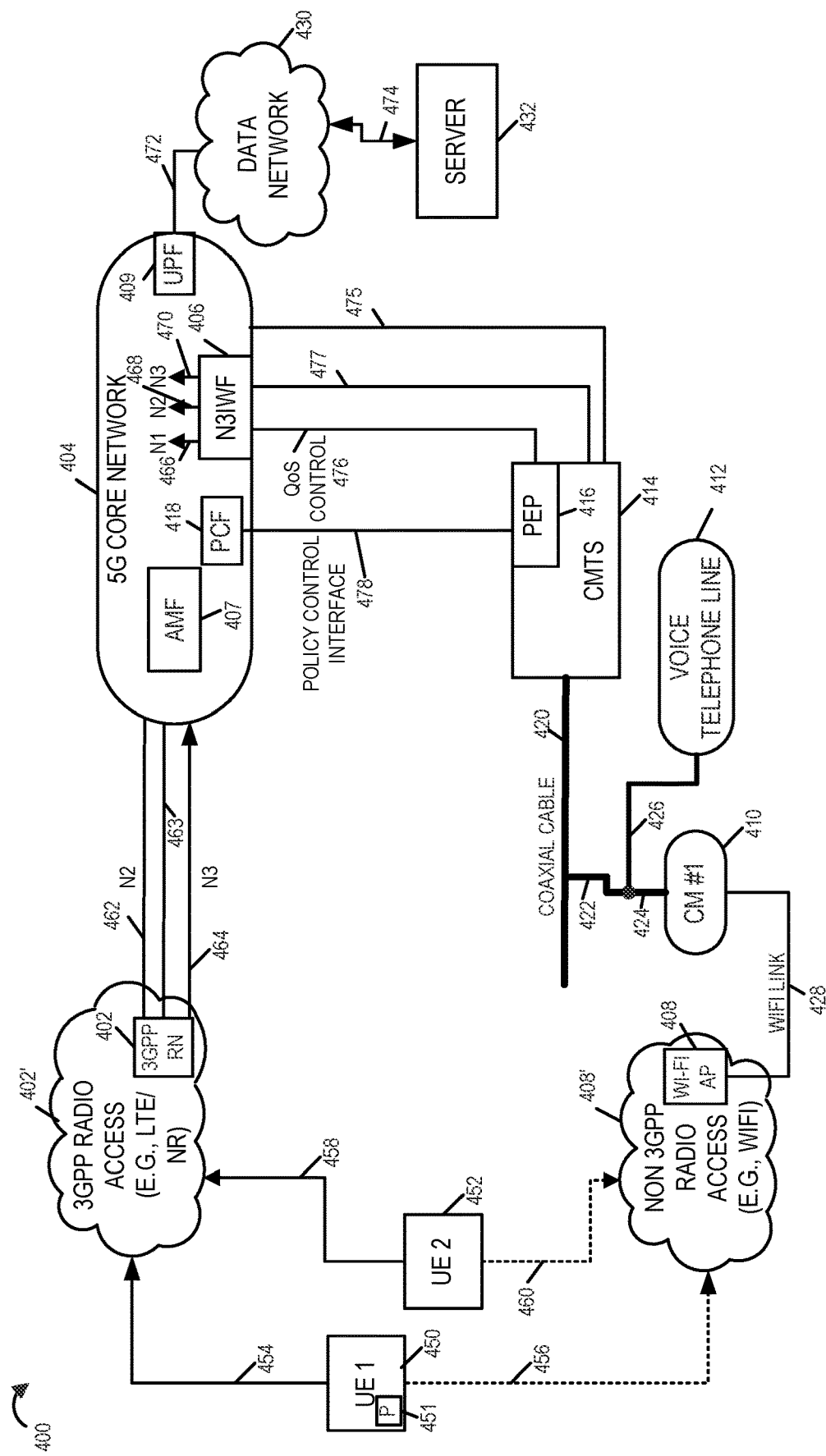
FIG. 4 is a drawing showing an exemplary communications system including a 5G core network, said system supporting 3GPP radio access and non 3GPP radio access for user equipment devices, said system supporting desired levels of Quality of Service for a communications path traversing a cable modem and a cable modem termination system, in accordance with an exemplary embodiment.

As depicted in the exemplary system 400 of FIG. 4, implemented in accordance with novel features of the present invention, UE 1 450 or UE 2 452 are able to experience the same QoE regardless of which radio access is used, provided the QoS request is granted.

In accordance with a feature of an exemplary embodiment, multiple UE's attached to the same cable modem, e.g. UE 1 450 and UE 2 452, attached to CM 1 410, can be differentiated within the cable network. In accordance with another feature of an exemplary embodiment, "slicing", can be, and sometimes is, extended via the cable network.

FIG. 4 is a drawing showing an exemplary communications system 400 in accordance with the present invention. In the exemplary system 400 of FIG. 4, UE1 450 and UE 2 452 can be connected to the same server 432 via Docsis or 3GPP radio access, using a common 5G core network 404. Exemplary communications system 400 includes a plurality of UEs including UE 1 450 and UE 2 452, a 3GPP radio access network 402', e.g., a LTE/NR network, including a 3GPP LTE/NR radio node 402, e.g., LTE/NR base station or access point, a non-3GPP radio access network 408', e.g., a WiFi radio access network, including a non-3GPP access point 408, e.g., a WiFi base station, a 5G core network 404 including N3IWF 406, AMF 407, PCF 418, and UPF 409, a CM#1 410, a voice telephone line 412, a CMTS 414 including a Policy Enforcement Point (PEP) 416, a coaxial cable 420, a connection 422, a connection 424, a connection 426, a data network 430 and a server 432, coupled together as shown in FIG. 4. In various embodiments, connections 422, 424 and 426 are part of coaxial cable 420. Each UE (450, 452) includes a wireless receiver, a wireless transmitter, a processor, memory, an assembly of hardware components, e.g., circuits, an input device and an output device, coupled together via a bus over which the various elements may interchange data and information. UE 450 includes processor 451.

UE 1 450 is coupled to 3GPP radio access component 402 via 3GPP wireless link 454. UE 1 450 is coupled to non-3GPP radio access component 408 via non-3GPP wireless link 456, e.g., a WiFi wireless link. UE 2 454 is coupled to 3GPP radio access component 402 via 3GPP wireless link 458. UE 1 454 is coupled to non-3GPP radio access component 408 via non-3GPP wireless link 460, e.g., a WiFi wireless link.

The 3 GPP radio access component 402, e.g., a LTE/NR base station, is coupled to the 5G core network via communications link 463. 3GPP radio access component 402 is coupled to the 5G core network 404 via N2 interface connection 462 and via N3 interface connection 464. The non-3GPP radio access component 408 is coupled to CM#1 410 via WiFi link 428. CM#1 410 is coupled to CMTS 414 via connection 424, connection 422 and coaxial cable 420. Voice telephone line 412 is coupled to coaxial cable 420 via connection 426 and connection 424.

CMTS 414 is coupled to the N3IWF 406 of 5G core network 404, via link 477. The PEP 416 of CMTS 414 is coupled to AF 418 via policy control interface 478. The PEP 416 is coupled to N3IWF 406 of 5G core network 404 via QoS control 476. CMTS 414 is coupled to the 5G core network 404 via communications link 477.

The 5G core network 404 is coupled to data network 430 via link 472. The data network 430 is coupled to server 432 via link 474.

Figure 5A:
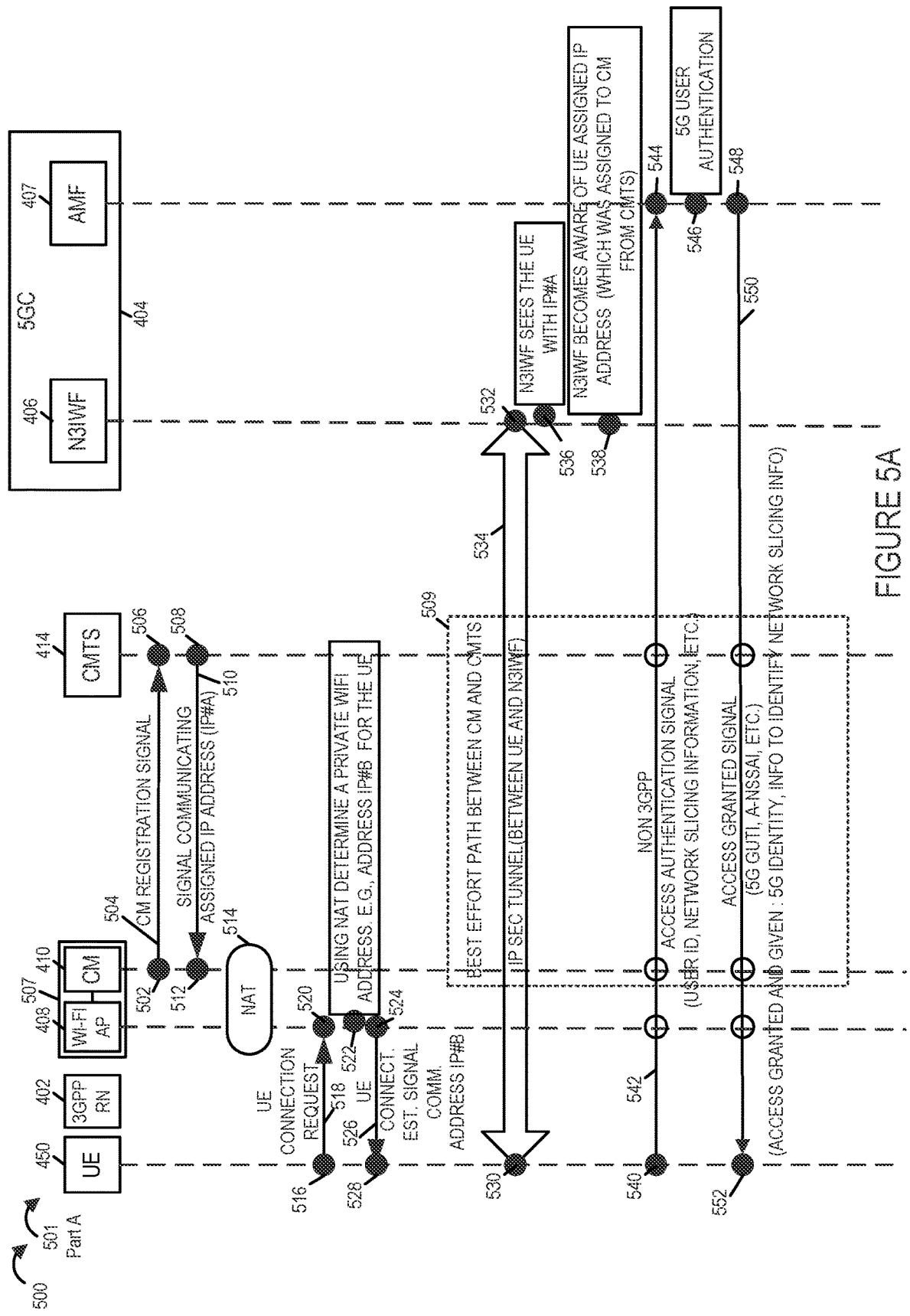
FIG. 5A is a first part of is an exemplary signaling diagram illustrating an exemplary communications method in accordance with an exemplary embodiment.

FIG. 5, comprising the combination of FIG. 5A and FIG. 5B, is a signaling diagram 500, comprising the combination of Part A 501 and Part B 503, illustrating exemplary components of system 400 of FIG. 4 including UE 450, 3GPP RN 402, Wi-Fi AP 408, CM 410, CMTS 414, 5G core network 404 including N3IWF 406 and AMF 407, and further illustrating an exemplary communications method in accordance with an exemplary embodiment. Network Address Translator (NAT) 514 is included in WiF AP 408 or CM 410 or is accessible to Wi-Fi AP 408 or CM 410. In some embodiments, the WiFi Access Point 408 and the Cable Modem 410 and co-located within device 507.

In step 502, cable modem (CM) 410 generates and send a cable mode registration signal 504 to cable modem termination system (CMTS) 414. In step 506 CMTS 414 receives cable modem registration signal 504 and processes the registration request. In step 508 the CMTS 414 decides to register CM 410, assigns an IP address to CM 410, e.g., IP#A, generates signal 510 communicating the assigned IP address, IP#A, and sends the generated signal 510 to CM 410. In step 512 CM 410 receives signal 510 and recovers the communicated assigned IP address, IP#A.

In step 516, UE 450 generates and sends a UE connection request signal 518 to WiFi AP 408, which is received in step 520 by WiFi AP 408. In step 520, WiFi AP 408 uses Network Address Translator (NAT) 514 to determine a private WiFi network address, e.g., address IP#B, for UE 450. In step 524, WiFI AP 408 generates and transmits UE connection establishment signal 526 to UE 450 communicating address IP#B. In step 520, UE 450 receives UE connection establishment signal 526 and recovers the information communicated in signal 526 including address IP#B.

In step 530 and 532, the UE 450, and Non-3GPP Interworking Function (N3IWF) 406 of 5GC core network 404 send and receive signals to establish an IP SEC tunnel 534 between the UE 450 and the N3IWF 406. In step 536, as part of the tunnel establishment, the N3IWF 406 sees the UE 450 with address IP#A. In step 538 the N3IWF 406 becomes aware of the UE assigned IP address, IP#A, which was assigned to the CM 410 from the CMTS 414.

In step 540, the UE 450 generates and sends a Non 3GPP access authentication signal 542, to the Access and Mobility Management Function (AMF) 407 of the 5G core 404. Non-3GPP access authentication signal 542 includes user ID and network slicing information. Signal 542 is received by AMF 407 in step 544, and AMF 407 recovers the communicated information. In step 546, AMF 546 processes the authentication request and obtains 5G user authentication. In step 548, the AMF 407 generates and sends access granted signal 550 to UE 450. The access granted signal 550 includes a 5G Globally Unique Temporary Identifier (GUTI) and Allowed Network Slice Selection Assistance Information (A-NSSAI). Thus access granted signal 550 conveys that UE 450 has been granted access and has been given a 5G identity and information to identify network slicing information. In step 552 UE 450 receives access granted signal 550 and recovers the communicated information.

The tunnel establishment signals for establishing the IP sec tunnel 534 between the UE 450 and N3IWF 406, the non-3GPP access authentication signal 542 and access granted signal 550 are communicated using a best effort path between the CM 410 and CMTS 414, as indicated by dotted box 509.

In step 554, UE 450 generates and sends protocol data unit (PDU) session establishment request signal 556 to AMF 407 of 5G core 404. PDU session establishment request 556 includes a PDU session ID, Session and Service Continuity (SSC) mode, and type. In step 557 the CM 410 is operated to communicate the PDU session establishment request 556 being sent from the UE to the 5G wireless network core 404 to establish a new PDU session for the UE 450. In step 559 the CMTS 414 is operated to communicate the PDU session establishment request 556 being sent from the UE to the 5G wireless network core 404 to establish a new PDU session for the UE 450.

In step 558, AMF 407 of 5G core 404 receives PDU session establishment request signal 556 and recovers the communicated information. In step 560 AMF 407 generates and sends PDU request signal 562 to N3IWF 406. PDU request signal 562 includes QoS profiles. In step 564, N3IWF 406 receives the PDU request signal 562 and recovers the communicated information.

In step 566 and 568 the N3IWF 406 of the 5GC 404 and the UE 450 communicate PDU session signaling 570 to create a child security association (ch-SA) and to communicate information for the new PDU session. Information communicated in PDU session signaling 570 includes child security association information for the new PDU session along with an IP address and port number to be used by the new PDU session. Port Numbers, e.g., ports numbers in UDP headers, can be used to identify individual endpoints, e.g., individual UEs, "behind" the NAT, e.g., NAT 514. In step 567 the CM 410 is operated to communicate PDU session signaling 570, which is being communicated between the UE 450 and the N3IWF 406 of the 5GC 404, which is a wireless network core. In step 569 the CMTS 414 is operated to communicate PDU session signaling 570, which is being communicated between the UE 450 and the N3IWF 406 of the 5GC 404, which is a wireless network core.

In step 572 the 5G core 404 receives: bandwidth information and latency information that the UE is using for the application or applications for this PDU session. In step 573 the 5G core 404 discovers that the CMTS that is serving the UE 450 is CMTS 414 based on the IP address assigned to the UE 450 via CM 410, which is IP address IP#A.

In step 574, the N3IWF 406 generates and sends QoS request signal 575 to CMTS 414. QoS request signal 575 includes a QoS request information indicating a desired level of QoS for a PDU session for UE 450 and IP.port instruction information, e.g., an IP address and port number used for communicating with the UE 450 via the cable modem 410 and the CMTS 414. In some embodiments, QoS request signals includes information corresponding to multiple created child security associations. In some embodiments, the QoS request signal 575 includes required bandwidth and latency information associated with each security association (SA) or child security association (ch-SA) based on IP/Port# to CMTS for scheduling purposes. In step 576, CMTS 414 receives signal 575 and recovers the communicated information. Thus, in step 576 the CMTS 414 receives QoS request 575 requesting a desired level of QoS for a PDU session for UE 450, said QoS request 475 including an IP address, e.g., IP address IP#A, and port number used for communicating with UE 450 via cable modem 410 and CMTS 414. In some embodiments, the PDU session is a protocol data unit session over a logical connection between UE 450 and a data network, e.g., data network 430, which traverses the CM 410 and the CMTS 414.

In step 577 and 578 the CMTS 414 and CM 410 communicate cable modem configuration signaling 579 and negotiate bandwidth based on service flow ID information and IP port # mapping information. Thus, in step 577 the CMTS 414 is operated to negotiate with the cable modem 410 to determine if the requested QoS can be supported.

In step 580, CMTS 414 generates and sends a QoS request result message signal 581 communicating to the N3IWF 406 of 5G core 404, which is a wireless network core, a response to the QoS request 575. In various embodiments, the QoS request result message 581 includes information indicating one of: i) request granted or ii) request failed. In various embodiments, the QoS request result message 581 is based on whether the negotiation with the CM 410 indicates a requested QoS level will be supported for the PDU session between the cable modem 410 and the CMTS 414.

In step 582, N3IWF 406 receives signal 581 and recovers the communicated information. In step 583, the N3IWF 406 generates and sends signal 584 communicating QoS grant status information. In step 585 AMF 407 receives signal 584 and recovers the communicated information.

In step 586, assuming the request has been granted, N3IWF 406 of 5G core 404 generates and sends PDU session establishment accept signal 587 to UE 450, including the QoS expectation information, said signal being communicated via the CMTS 414 and CM 410. In step 5861 the CMTS is operated to communicate the PDU session establishment accept signal 587 being sent by the N3IWF 406 of the 5G wireless core 404 to the UE 450 via the cable modem 410 as part of establishing the PDU session. In step 5862 the CM 410 is operated to communicate the PDU session establishment accept signal 587 being sent by the N3IWF 406 of the 5G wireless core 404 along a path including the CMTS 414 and CM 410 to the UE 450 via and cable modem 410 as part of establishing the PDU session.

In step 588 UE 450 receives the PDU session establishment accept signal 587 and recovers the communicated information indicating accept. As an alternative to including QoS expectation information in step 586, in step 589, assuming the request has been granted, AMF 407 of 5GC 404 generates and sends a NAS message 590, e.g., QoS grant message, via CMTS 414 and CM 410 to UE 450 communicating QoS expectation information. In step 5891 CMTS 414 is operated to communicate QoS expectation information message 590, being sent by the AMF 407 of the 5G wireless core 404 to the UE 450 via the cable modem 410. In step 5892 CM 404 is operated to communicate QoS expectation information message 590, being sent by the AMF 407 of the 5G wireless core 404 to the UE 450 along the path including the CMTS 414 and CM 410.

In step 591, UE 450 receives NAS message 590 and recovers the communicated QoS expectation information. In step 592 UE 450 is operated to make a decision whether to implement a handoff of an ongoing session, e.g. an ongoing voice session, from a cellular wireless network to said PDU session based on the QoS expectation information. Thus, in step 592 UE 450 decides to remain with 3GPP or to switch to non-3GPP radio access, e.g., with regard to the requested PDU session, based on whether or not signals 587 and 590 are received and/or based on information included in signals 587 and 590.

In step 593 UE 450 implements the decision of step 592. Assuming the decision of step 592 is a decision to handoff, in step 593 the UE 450 generates and sends a handoff signal 594 to AMF 407 of 5GC 404, said handoff signal 594 to be communicated via CM 410 and CMTS 414. In step 596, the CM 410 is operated to communicate the handoff signal 594 being sent from the UE 450 to the wireless core 404 via CM 410 and CMTS 414. In step 597, the CMTS 414 is operated to communicate the handoff signal 594 being sent from the UE 450 to the wireless core 404 via CM 410 and CMTS 414, said handoff signal indicating a decision by the UE to handoff to said PDU session. In step 595 AMF 407 of 5GC core 404 receives handoff signal 597 and performs operations to implement the handoff.

Figure 6:
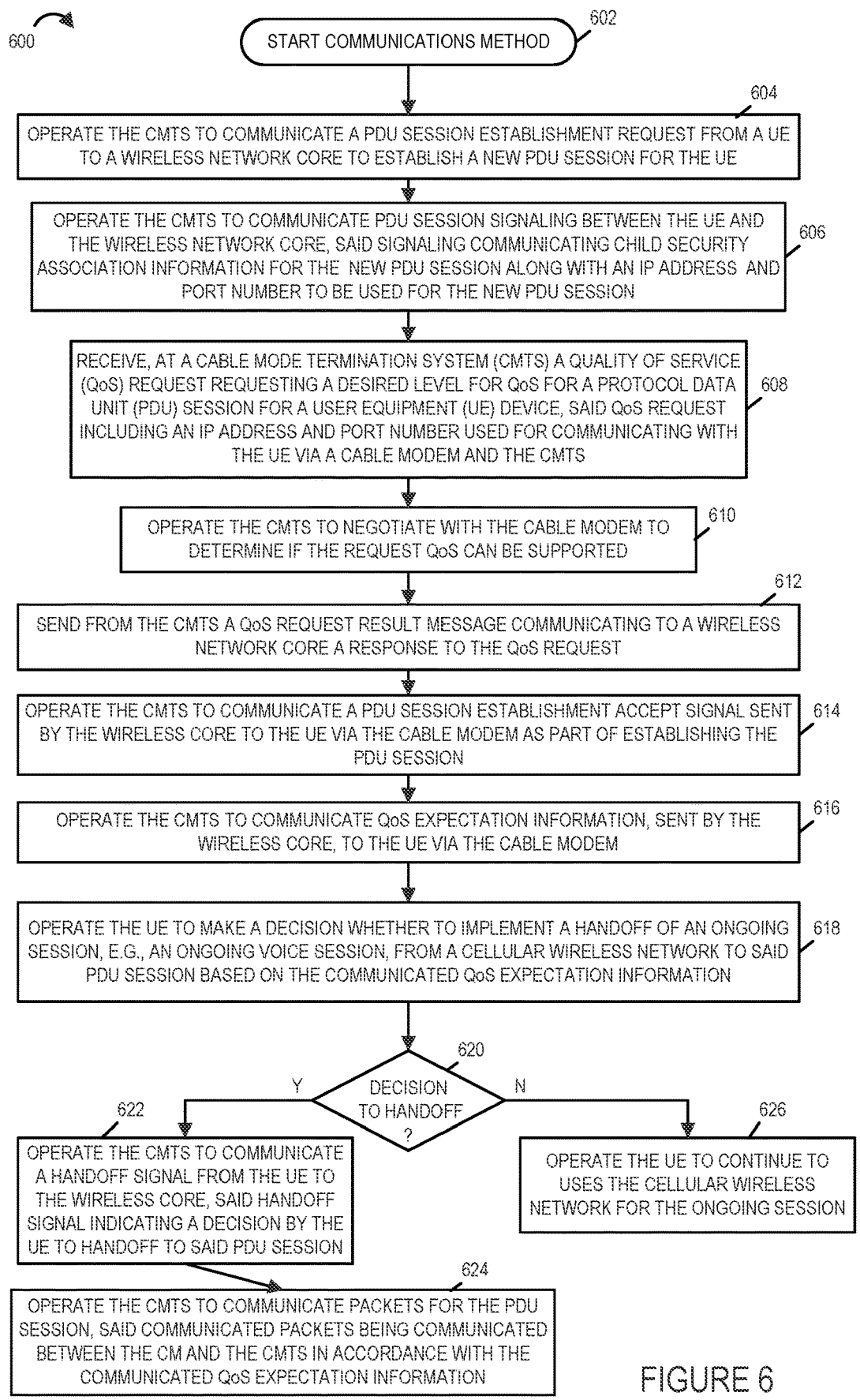
FIG. 6 is a flowchart of an exemplary communications method in accordance with an exemplary embodiment.

FIG. 6 is a flowchart 600 of an exemplary communications method in accordance with an exemplary embodiment. The method of flowchart 600 may be implemented by an exemplary communications system, e.g., communications system 400 of FIG. 4. Operation starts in step 602 and proceeds to step 604.

In step 604 the cable modem termination system, e.g., CMTS 414, is operated to communicate a PDU session establishment request, e.g., signal 556, from a UE, e.g., UE 450, to a wireless network core, e.g., 5G core network 404, to establish a new PDU session for the UE. Operation proceeds from step 604 to step 606.

In step 606 the CMTS is operated to communicate PDU session signaling, e.g., PDU session signaling 570, between the UE and the wireless network core, said signaling communicating child security association information for the new PDU session along with an IP address and port number to be used for the new PDU session. Operation proceeds from step 606 to step 608.

In step 608, the CMTS receives a quality of service (QoS) request, e.g., signal 575, requesting a desired level for QoS for a protocol data unit (PDU) session for the UE device, said QoS request including an IP address, e.g., address IP #A and port number, e.g., a port number of CM#1, used for communicating with the UE via a cable modem, e.g., CM #1 410, and the CMTS. In some embodiments, the PDU session is a protocol data unit session over a logical connection between the UE and a data network, e.g., data network 430, which traverses the cable modem and the CMTS. Operation proceeds from step 608 to step 610.

In step 610 the CMTS is operated to negotiate with the cable modem to determine if the requested QoS can be supported, e.g., communicating CM configurations signals 579. In various embodiments, bandwidth is negotiated based on service flow ID and IP/Port # mapping information. Operation proceeds from step 610 to step 612.

In step 612 the CMTS sends a QoS request result message, e.g., message 581, communicating to the wireless network core a response to the QoS request. In some embodiments, the QoS request result message is based on whether the negotiation with the cable modem indicates a requested QoS level will be supported for the PDU session between the cable modem and the CMTS. In some embodiments, the QoS result message indicates one of: i) request granted or ii) request failed. Operation proceeds from step 612 to step 614.

In step 614 the CMTS is operated to communicate a PDU session establishment accept signal, e.g., signal 587, sent by the wireless core to the UE via the cable modem as part of establishing the PDU session. Operation proceeds from step 614 to step 616.

In step 616 the CMTS is operated to communicate QoS expectation information, e.g. QoS expectation information 590 in a NAS message, sent by the wireless core to the UE via the cable modem. Operation proceeds from step 616 to step 618.

In step 618 the UE is operated to make a decision whether to implement a handoff of an ongoing session, e.g., an ongoing voice session, from a cellular wireless network, e.g., a LTE or new radio (NR) cellular wireless network, to said PDU session based on the communicated QoS expectation information. Operation proceeds from step 618 to step 620.

In step 620 if the decision of step 618 if a decision to handoff then operation proceeds from step 620 to step 622; however, if the decision of step 618 is a decision not to hand off then operation proceeds from step 620 to step 626.

In step 622 the CMTS is operated to communicate a handoff signal, e.g., signal 594, from the UE to the wireless core, said handoff signal indicating a decision by the UE to handoff to the PDU session. Operation proceeds from step 622 to step 624. In step 624 the CMTS is operated to communicate packets for the PDU session, said communicated packets being communicated between the CM and the CMTS, e.g., along cable 420, along the path between UE 450 and data network 430 or server 432, in accordance with the communicated QoS expectation information. In step 626 the UE is operated to continue to use the cellular wireless network for the ongoing session.

Figure 7:
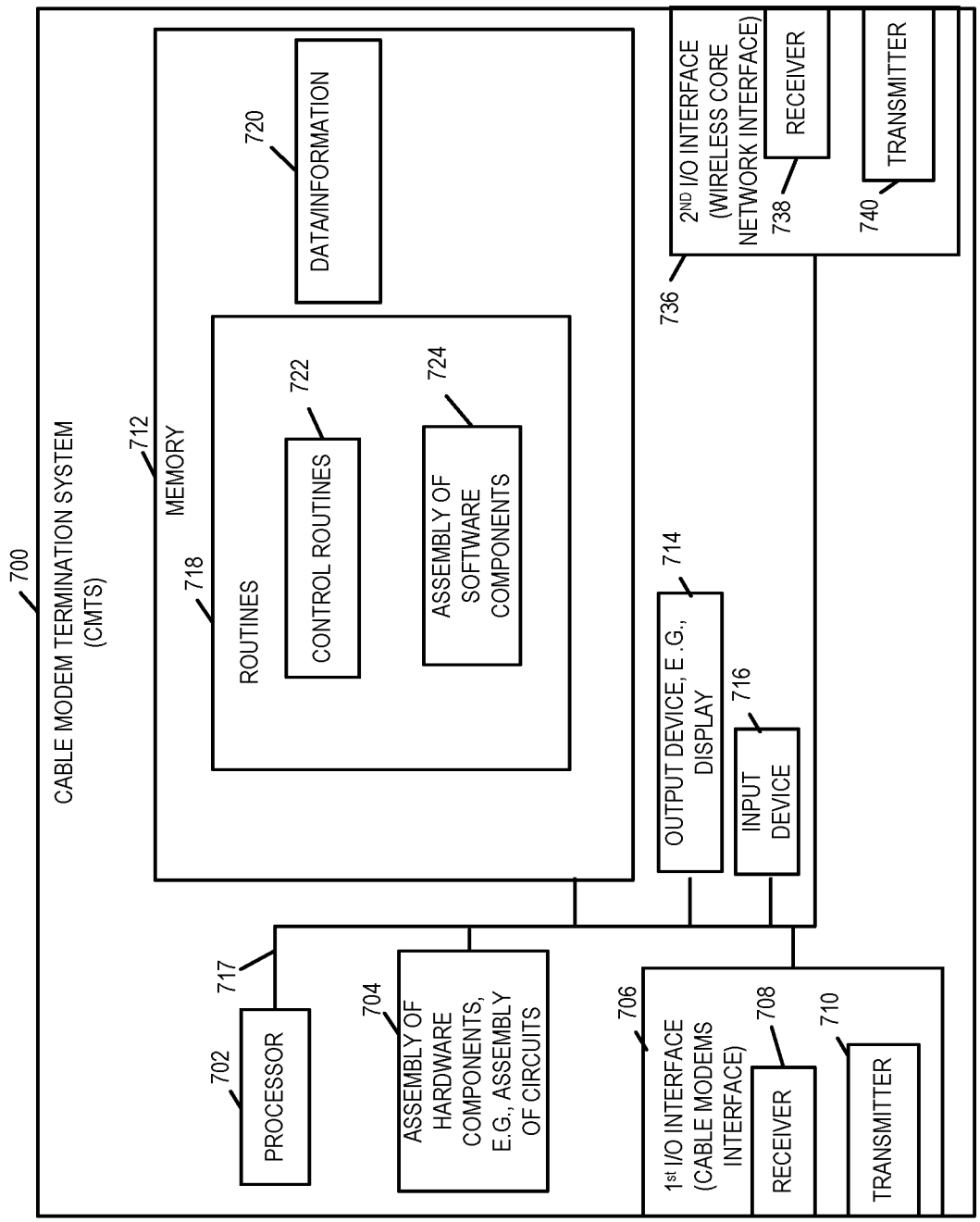
FIG. 7 is a drawing of an exemplary cable modem termination system (CMTS) in accordance with an exemplary embodiment.

FIG. 7 is a drawing of an exemplary cable modem termination system (CMTS) 700 in accordance with an exemplary embodiment. CMTS 700 is, e.g. CMTS 414 of FIGS. 4 and 5. CMTS 700 includes a processor 702, e.g., a CPU, an assembly of hardware components 704, e.g., an assembly of circuits, a first I/O interface 706, e.g., a cable modems interface, including a receiver 708 and a transmitter 710, a second I/O interface 736, e.g., a wireless core network interface, including a receiver 738 and a transmitter 740, memory 712, an input device 716, e.g., a keyboard, mouse, etc., and an output device 714, e.g., a display, coupled together via a bus 717 over which the various elements may interchange data and information.

Memory 712 includes routines 718 and data/information 720. Routines 718 includes control routines 722 and assembly of software components 724. Receiver 708 receives signals from a plurality of cable modems which are coupled to the CMTS 700. Transmitter 710 transmits signals to the plurality of cable modems which are coupled to CMTS 700. Receiver 738 receives signals from a wireless core network, e.g., a 5C core network, which is coupled to the CMTS 700. Transmitter 740 transmits signals to a wireless core network, e.g., a 5C core network, which is coupled to the CMTS 700.

FIG. 8 is a drawing of an exemplary assembly of components 800 in accordance an exemplary embodiment. Assembly of components is, e.g., included in cable modem termination system (CMTS) 414 of FIG. 4 or FIG. 5 or CMTS 700 of FIG. 7.

Assembly of components 800 may be included in an exemplary CMTS 700. The components in the assembly of components 800 can, and in some embodiments are, implemented fully in hardware within a processor, e.g., processor 702, e.g., as individual circuits. The components in the assembly of components 800 can, and in some embodiments are, implemented fully in hardware within the assembly of hardware components 704, e.g., as individual circuits corresponding to the different components. In other embodiments some of the components are implemented, e.g., as circuits, within processor 702 with other components being implemented, e.g., as circuits within assembly of components 704, external to and coupled to the processor 702. As should be appreciated the level of integration of components on the processor and/or with some components being external to the processor may be one of design choice. Alternatively, rather than being implemented as circuits, all or some of the components may be implemented in software and stored in the memory 712 of the CMTS 700, with the components controlling operation of CMTS 700 to implement the functions corresponding to the components when the components are executed by a processor e.g., processor 702. In some such embodiments, the assembly of components 800 is included in the memory 712 as assembly of software components 724. In still other embodiments, various components in assembly of components 800 are implemented as a combination of hardware and software, e.g., with another circuit external to the processor providing input to the processor which then under software control operates to perform a portion of a component's function.

When implemented in software the components include code, which when executed by a processor, e.g., processor 702, configure the processor to implement the function corresponding to the component. In embodiments where the assembly of components 800 is stored in the memory 712, the memory 712 is a computer program product comprising a computer readable medium comprising code, e.g., individual code for each component, for causing at least one computer, e.g., processor 702, to implement the functions to which the components correspond.

Completely hardware based or completely software based components may be used. However, it should be appreciated that any combination of software and hardware, e.g., circuit implemented components may be used to implement the functions. As should be appreciated, the components illustrated in FIG. 8 control and/or configure the CMTS 700 or elements therein such as the processor 702, to perform the functions of corresponding steps illustrated and/or described in the method of one or more of the signaling diagram 500 of FIG. 5, the flowchart 600 of FIG. 6 and/or described with respect to any of the Figures or text. Thus the assembly of components 800 includes various components that perform functions of corresponding one or more described and/or illustrated steps of an exemplary method, e.g., one or more steps of the method of FIG. 5 or FIG. 6.

Assembly of components 800 includes a component 804 configured to operate the CMTS to communicate a PDU session establishment request from a UE to a wireless network core to establish a new PDU session for the UE, a component 806 configured to operate the CMTS to communicate PDU session signaling between the UE and the wireless network core, said signaling communicating child security association information for the new PDU session along with an IP address and port number to be used to for the new PDU session, and a component 808 configured to control a receiver to receive at the cable mode termination system a quality of service request requesting a desired level for QoS for a protocol data unit session for a user equipment device, said QoS request including an IP address and port number used for communicating with the UE via a cable modem and the CMTS.

Assembly of components 800 further includes a component 810 configured to operate the CMTS to negotiate with the cable modem to determine if the requested QoS can be supports, a component 812 configured to send from the CMTS a QoS request result message communicating to a wireless network core a response to the QoS request, a component 814 configured to se operate the CMTS to communicate a PDU session establishment accept signal send by the wireless core to the UE via the cable modem as part of establishing the PDU session, and a component 816 configured to operate the CMTS to communicate QoS expectation information sent by the wireless core to the Ue via the cable modem.

Assembly of components 800 further includes a component 822 configured to operate the CMTS to communicate a handoff signal from the UE to the wireless core, said handoff signal indicating a decision by the UE to handoff to said PDU session, and a component 824 configured to operate the CMTS to communicate packets for the PDU session, said communicated packets being communicated between the CM and CMTS in accordance with the communicated QoS expectation information.

Figure 9:
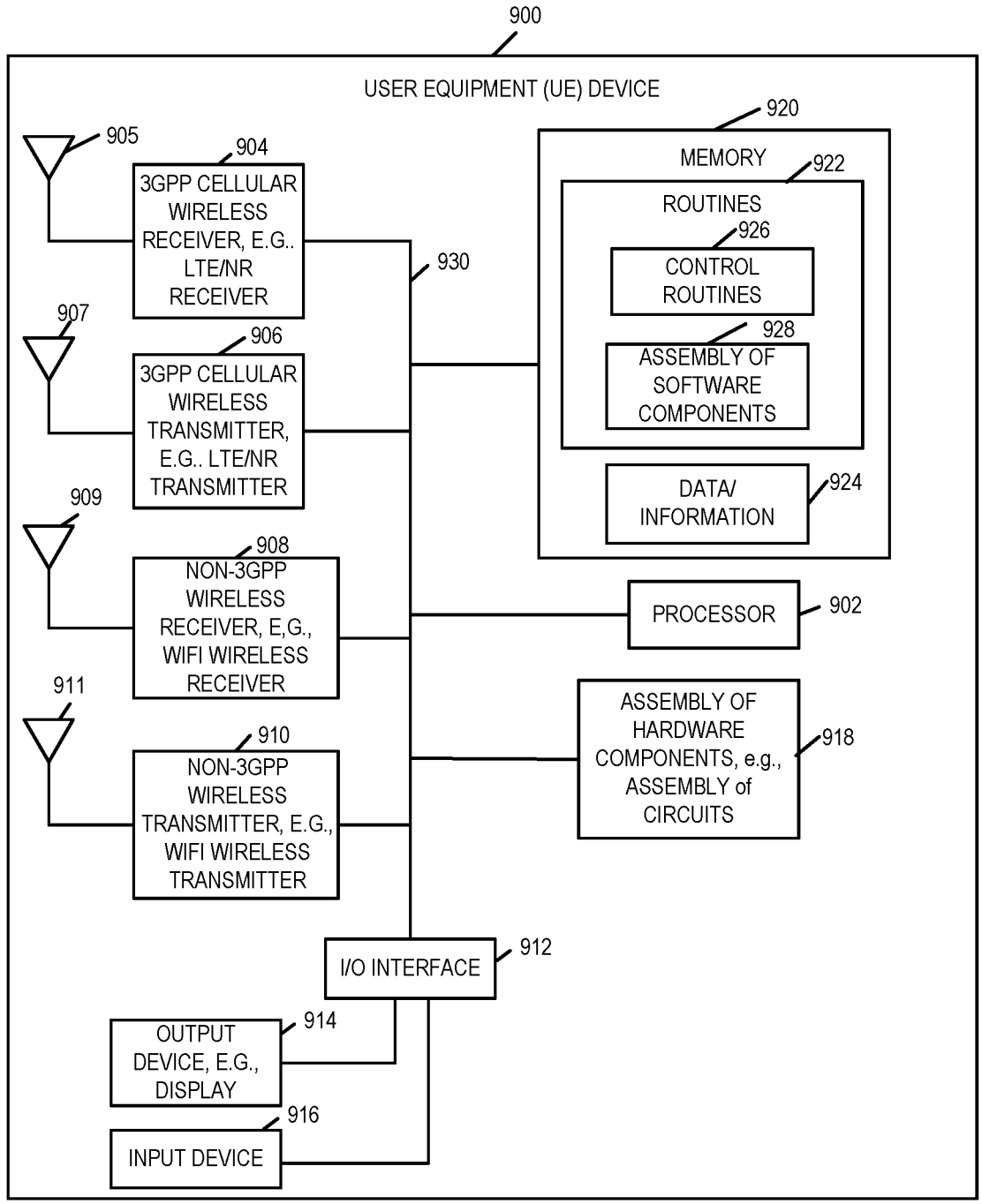
FIG. 9 is a drawing of an exemplary user equipment (UE) device implemented in accordance with an exemplary embodiment.

FIG. 9 is a drawing of an exemplary user equipment (UE) device 900 in accordance with an exemplary embodiment. UE device 900 is, e.g., UE device 450 or 452 of FIG. 4 or FIG. 5. UE device 900 includes a 3GPP cellular wireless receiver 904, e.g., a LTE/NR receiver, coupled to a receive antenna 905, a 3GPP cellular wireless transmitter 906, e.g., a LTE/NR transmitter, coupled to a transmit antenna 907, a non-3GPP wireless receiver 908, e.g., a WiFi wireless receiver, coupled to a receive antenna 909, a non-3GPP wireless transmitter 910, e.g., a WiFi wireless transmitter, coupled to a transmit antenna 911. In some embodiments, the same antenna is used for one or more of devices 904, 906, 908, 910. In some embodiments a receiver/transmitter pair is included in a transceiver, e.g., a transceiver chip.

UE device 900 further includes an output device(s) 914, e.g., a display, speaker, etc., and an input device(s) 916, e.g., keyboard, keypad, switch, touch screen input interface, etc. The input and output devices (916, 914) are coupled to an I/O interface 912. UE device 900 further includes a processor 902, e.g., a CPU, memory 920, and an assembly of hardware components, e.g., assembly of circuits. Receiver 904, transmitter 906, receiver 908, transmitter 910, I/O interface 912, processor 902 and memory 920 are coupled together via a bus 930 via which the various elements many interchange data and information.

Memory 920 includes routines 922 and data/information 924. Routines 922 includes control routines 926 and assembly of software components 928. UE device 900 may implement steps of the exemplary method of FIG. 5 of FIG. 6, e.g., steps performed by UE device 450, e.g., steps 516, 518, 528, 530, 540, 552, 554, 568, 588, 591, 592, 593, 618, 620, and 626. An exemplary step or portion of a step performed by UE 900 may be implemented by processor 902, a component in assembly of hardware components 918 or a component in assembly of software components 928.

Figure 10:
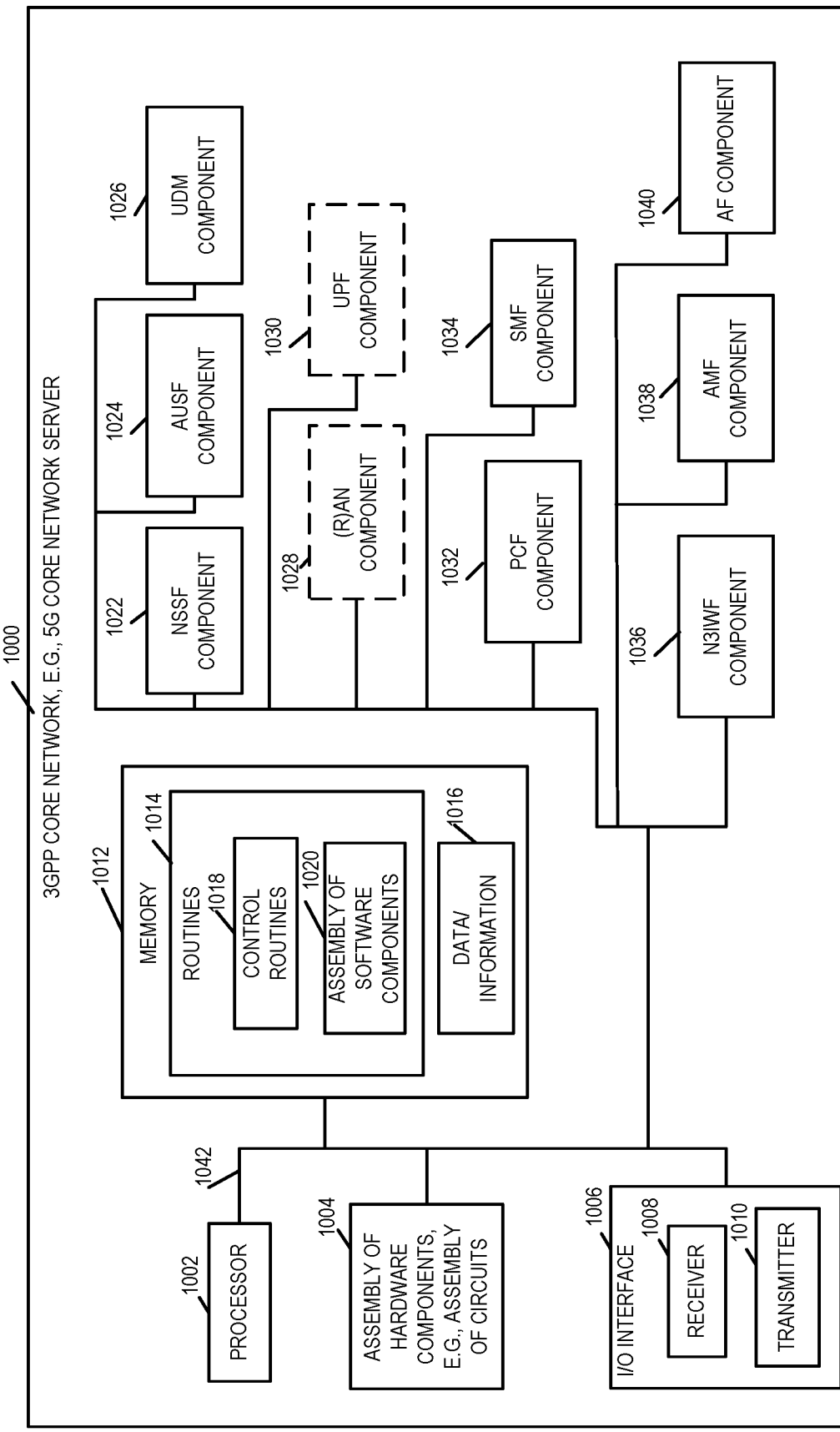
FIG. 10 is a drawing of an exemplary 3GPP core network, e.g., a 5G core network server, implemented in accordance with an exemplary embodiment.

FIG. 10 is a drawing of an exemplary 3GPP core network 1000, e.g., a 3GPP 5G core network server, in accordance with an exemplary embodiment. 3GPP core network 1000 is, e.g., 5G core network 404 of FIG. 4 or FIG. 5. 3GPP core network 1000 includes a processor 1002, e.g., a CPU, an assembly of hardware components 1004, e.g. assembly of circuits, an I/O interface 1006, memory 1012, a NSSF component 1022, a AUSF component 1024, a UDM component 1026, a (R)AN component 1028, a UDF component 1030, a PCF component 1032, a SMF component 1034, a N3IWF component 1036, a AMF component 1038, and a AF component 1040 coupled together via a bus 1042 over which the various elements may interchange data and information. In various embodiments, the (R)AN component 1028, e.g., a 3GPP LTE/NR access point including a cellular wireless receiver and a cellular wireless transmitter is located external to device 1000, and is coupled to device 1000. In some embodiments, the UPF component 1030, e.g., including functionality similar to a serving gateway (SGW) and PDN packet gateway (PGW), is located external to device 1000, and is coupled to device 1000.

N3IWF component 1036 is, e.g. N3IWF 406 of FIG. 4 and FIG. 5. AMF component 1038 is, e.g. AMF 407 of FIG. 4 and FIG. 5. AF component 1040 is, e.g. AF 418 of FIG. 4. UPF 1030 is, e.g., UPF 409 of FIG. 4. (R)AN 1028 is, e.g., 3GPP RN 402 of FIGS. 4 and 5.

I/O interface 1006 includes receiver 1008 and transmitter 1010. I/O interface 1006 couples the 3GPP core network 1000 to other network devices and/or networks, e.g., a cable modem termination system (CMTS), servers, a data network, a 3GPP LTE/NR access point, etc.

Memory 1012 includes routines 1014 and data/information 1016. Routines 1014 includes control routines 1018 and assembly of software components 1020.

The 3GPP core network 1000 may implement steps of the exemplary methods of FIG. 5 performed by the 5G core 404, e.g., steps 558, 560, 564, 566, 572, 573, 574, 582, 583, 585, 586, 589, and 595. An exemplary step performed by 3GPP core network or part of a step performed by 3GPP core network 1000 may be implemented by processor 1002, a component in assembly of hardware components 1004, a component within assembly of software components 1020, NSSF component 1022, AUSF component 1024, UDM component 1026, (R)AN component 1028, UDF component 1030, PCF component 1032, a SMF component 1034, N3IWF component 1036, AMF component 1038, AF component 1040, receiver 1008 or transmitter 1010. In some embodiments, one or more of: NSSF component 1022, AUSF component 1024, UDM component 1026, (R)AN component 1028, UDF component 1030, PCF component 1032, a SMF component 1034, N3IWF component 1036, AMF component 1038, and AF component 1040, are implemented in software and included in assembly of software components. In some embodiments, one or more or all of: NSSF component 1022, AUSF component 1024, UDM component 1026, (R)AN component 1028, UDF component 1030, PCF component 1032, a SMF component 1034, N3IWF component 1036, AMF component 1038, AF component 1040 correspond to different circuit boards in the 5GC core 1000.

Various aspects and/or features of the some embodiments of the present invention are discussed below. In various embodiments UEs, e.g., UE1 and UE2, can be, and sometimes are, connected to the same server via Docsis or 3GPP radio access, using a common 5G core network. An advantageous feature of various embodiments, implemented in accordance with the present invention, is that an exemplary system allows the same Quality of Experience (QoE) to be provided by the Docsis network when a UE is moving from 3GPP radio access to non-3GPP radio access with backhaul using Docsis network.

Exemplary use cases which benefit from the present invention are described below.

Case 1: QoE based on different QoS (Quality of Service) Profiles for different UE devices:
UE1 and UE2 are both attached to the same cable modem (CM).
UE1 has premium subscription (e.g., higher bandwidth and lower latency).
UE2 only have best effort data subscription.

If both UEs are using bandwidth intense application (e.g. Augmented Reality type), UE1 will have better QoE than UE2.

Case 2: QoE based on different "slice" used in the network for different UE devices:
UE3 and UE4 are both attached to same CM
UE3 is a special type of Internet of Things (IOT) device that requires low bandwidth data pipe and can tolerate congestion in the network. On the other hand, UE4 is another type of special type of IOT device that requires fixed bandwidth at a certain time of day.

In other words, UE3 and UE4 have different QoS requirements; hence, UE3 and UE 4 are associated with different "network slice" in order to meet their end to end QoS requirement.

Various features and/or aspects in accordance with some embodiments of the present invention are discussed below.
1. A UE behind the cable modem (CM) is identified by the cable modem termination system (CMTS) using the associated IP address/port#.
2. The IP address can be, and sometimes is, used by the 5GC to discover the serving CMTS.
3. 5GC (5G Core network) passes the required QoS information to CMTS to ensure the user or signaling plane can meet the expected bandwidth and latency requirement.
4. The UE receives confirmation from the 5GC of the expected QoE over Docsis. This allows the UE to stay with 3GPP access to maintain the current QoE if Docsis is not able to provide the required QoS.

Various features and features of an exemplary method are described below. An IPSEC tunnel is established between a UE and N3IWF via a best effort data pipe between a CM and a CMTS. In exemplary step 1, a Non-3GPP access authentication signal, e.g., including User ID, network slicing information, etc, is sent from the UE to the 5GC via the CM and CMTS, using a best effort data path between the CM and CMTS. In exemplary step 2, the 5GC performs user authentication. In exemplary step 3 the 5GC core grants access and sends an access granted signal, e.g., including a 5G GUTI, and A-NSSAI to the UE via the CMTS and the CM, using a best effort data path between the CMTS and CM. In exemplary step 4, the 5GC generates and sends a QoS request including QoS request level information and IP/port instruction information. In exemplary step 5 the CMTS and CM negotiate bandwidth based on service flow ID and IP/Port# mapping. In exemplary step 6, the CMTS generates and sends a QoS Request Result signal to the 5GC. In exemplary step 7, the 5GC generates and sends QoS expectation information to the UE.

The main relevant input from step 1-3 is that the UE is, granted access to 5GC and given the 5G identity (5G-GUTI) and also the allowed Network Slice Selection Assistance Information (A-NSSAI)) which is used to identify the network slicing information.

At step 4, the 5GC is able to discover the CMTS based on the UE point of attachment (i.e, the IP address assigned to the UE from CM/CMTS).

IP sec tunnel is established between UE and N3IWF prior to step 1. N3IWF is aware of the UE assigned IP address.
Based on this information, N3IWF can identify the CMTS that is serving this UE.
This security association may be associated with a specific QoS profile required at the Docsis level. I.e, for NAS (Network Access Stratum) signaling between UE and 5GC, or when UE is requesting a data session over non-3GPP access.

The required QoS profile is passed to N3IWF for the data session being requested during session establishment procedure.

- As part of the 3GPP procedure, each PDU session can be associated with a specific Child-SA (Security Association).
- Each Child-SA that is created can be identified with the UE assigned IP address (by CMTS) and specific port number that UE is using for that application.

N3-IWF passes the required bandwidth and latency information associated with each security association (SA) or child security association (Ch-SA) based on IP/Port# to CMTS for scheduling purpose.

At step 5, CMTS and CM negotiated bandwidth based on service flow ID and IP/Port# mapping.

At step 6 CMTS indicates whether the required QoS per IP/Port# is granted or failed to N3IWF. This information is passed back to AMF.

At step 7, AMF indicates to UE via NAS message regarding the QoE expectation status. UE may stay at 3GPP if resource is QoE cannot be met over Docsis network.

The communication between N3IWF and CMTS is down over QoS control. The communications between AMF and UE is done via N1 interface connection(s).

In various exemplary embodiments implemented in accordance with features of the present invention, the user experience is maintained when moving between 3GPP and no-3GPP (with Docsis) access.

Numbered List of Exemplary Embodiments

Method Embodiment 1 A communications method, the method comprising: receiving (575), at a cable mode termination system (CMTS) (414), a QoS (Quality of Service) request requesting a desired level of QoS for a Protocol Data Unit (PDU) session for a user equipment device (UE) (450), said QoS request including an IP address and port number used for communicating with the UE via a cable modem (410) and said CMTS; and sending (580), from the CMTS, a QoS request result message (581) communicating to a wireless network core a response to the QoS request.

Method Embodiment 2 The method of Method Embodiment 1, wherein said PDU session is protocol data unit session over a logical connection between the UE and a data network (430) which traverses the cable modem and the CMTS.

Method Embodiment 3 The method of Method Embodiment 1, further comprising: operating (577) the CMTS to negotiate with the cable modem to determine if the requested QoS can be supported; and wherein the QoS request result message (581) is based on whether the negotiation with the cable modem indicates a requested QoS level will be supported for the PDU session between the cable modem and the CMTS.

Method Embodiment 4 The method of Method Embodiment 3, wherein the QoS request result (581) indicates one of: i) request granted or ii) request failed.

Method Embodiment 5 The method of Method Embodiment 3, further comprising: prior to the CMTS receiving (576) the QoS request, operating (559) the CMTS to communicate a PDU session establishment request (556) from the UE to the wireless network core to establish a new PDU session for the UE; and operating (567) the CMTS to communicate PDU session signaling between the UE and wireless network core, said signaling (570) communicating child security association information for the new PDU session along with an IP address and port number to be used for the new PDU session.

Method Embodiment 6 The method of Method Embodiment 5, further comprising: operating (5861) the CMTS to communicate a PDU session establishment accept signal (587) sent by the wireless core to the UE via the cable modem as part of establishing the PDU session.

Method Embodiment 7 The method of Method Embodiment 6, further comprising: operating (5891) the CMTS to communicate QoS expectation information (590), sent by the wireless core, to the UE via the cable modem.

Method Embodiment 8 The method of Method Embodiment 7, wherein the QoS expectation information is included in a grant result sent to the UE in an NAS (non-access stratum) message from the wireless core to the UE.

Method Embodiment 9 The method of Method Embodiment 7, further comprising: operating (592) the UE to make a decision whether to implement a handoff of an ongoing voice session from a cellular wireless network to said PDU session based on the communicated QoS expectation information.

Method Embodiment 10 The method of Method Embodiment 7, further comprising: operating (597) the CMTS to communicate a handoff signal (594) from the UE to the wireless core, said handoff signal indicating a decision by the UE to handoff to said PDU session.

System Embodiment 11 A communications system comprising: a cable modem termination system (CMTS) including: a receiver configured to receive, at a cable mode termination system (CMTS), a QoS (Quality of Service) request requesting a desired level of QoS for a Protocol Data Unit (PDU) session for a user equipment device (UE), said QoS request including an IP address and port number used for communicating with the UE via a cable modem and said CMTS; and a transmitter configured to send, from the CMTS, a QoS request result message communicating to a wireless network core a response to the QoS request.

System Embodiment 12 The communications system of System Embodiment 11, wherein said PDU session is protocol data unit session over a logical connection between the UE and a data network which traverses the cable modem and the CMTS.

System Embodiment 13 The communications system of System Embodiment 11, wherein said cable modem termination system further includes: a first processor configured to operate the CMTS to negotiate with the cable modem to determine if the requested QoS can be supported; and wherein the QoS request result message is based on whether the negotiation with the cable modem indicates a requested QoS level will be supported for the PDU session between the cable modem and the CMTS.

System Embodiment 14 The communications system of System Embodiment 13, wherein the QoS request result indicates one of: i) request granted or ii) request failed.

System Embodiment 15 The communications system of System Embodiment 13, wherein said first processor is further configured to: operate the CMTS to communicate, prior to the CMTS receiving the QoS request, a PDU session establishment request from the UE to the wireless network core to establish a new PDU session for the UE; and operate the CMTS to communicate, prior to the CMTS receiving the QoS request, PDU session signaling between the UE and wireless network core, said signaling communicating child security association information for the new PDU session along with an IP address and port number to be used for the new PDU session.

System Embodiment 16 The communications system of System Embodiment 15, wherein said first processor is further configured to: operate the CMTS to communicate a PDU session establishment accept signal sent by the wireless core to the UE via the cable modem as part of establishing the PDU session.

System Embodiment 17 The communications system of System Embodiment 16, wherein said first processor is further configured to: operate the CMTS to communicate QoS expectation information, sent by the wireless core, to the UE via the cable modem.

System Embodiment 18 The communications system of System Embodiment 17, further comprising said UE device; and wherein said UE device includes a second processor configured to operate the UE to make a decision whether to implement a handoff of an ongoing voice session from a cellular wireless network to said PDU session based on the communicated QoS expectation information.

System Embodiment 19 The communications system of System Embodiment 17, wherein said first processor is further configured to: operate the CMTS to communicate a handoff signal from the UE to the wireless core, said handoff signal indicating a decision by the UE to handoff to said PDU session.

Computer Readable Medium Embodiment 20 A non-transitory computer readable medium including computer executable instructions which when executed by one or more processors of a communications system cause the communications system to perform the steps of: receiving, at a cable mode termination system (CMTS), a QoS (Quality of Service) request requesting a desired level of QoS for a Protocol Data Unit (PDU) session for a user equipment device (UE), said QoS request including an IP address and port number used for communicating with the UE via a cable modem and said CMTS; and sending, from the CMTS, a QoS request result message communicating to a wireless network core a response to the QoS request.

Computer Readable Medium Embodiment 21 The non-transitory computer readable medium of Computer Readable Medium Embodiment 20, wherein said PDU session is protocol data unit session over a logical connection between the UE and a data network which traverses the cable modem and the CMTS.

Computer Readable Medium Embodiment 22 The non-transitory computer readable medium of Computer Readable Medium Embodiment 20, further comprising: computer executable instructions which when executed by one or more processors of a communications system cause the communications system to perform the steps of: operating the CMTS to negotiate with the cable modem to determine if the requested QoS can be supported; and wherein the QoS request result message is based on whether the negotiation with the cable modem indicates a requested QoS level will be supported for the PDU session between the cable modem and the CMTS.

The techniques of various embodiments may be implemented using software, hardware and/or a combination of software and hardware. Various embodiments are directed to apparatus and/or systems, e.g., cable modem termination system (CMTSs), cable modems (CMs), a cable system including WiFi access components and using cable, e.g., coaxial cable for at least a portion of the backhaul, user equipment (UE) devices, a wireless cellular system, e.g., a 3GPP cellular system including LTE/NR wireless access components and using fiber for at least a portion of the backhaul, a 5G core network, core network components, a data network, access points, e.g., 3GPP LT/NR access points, e.g., base stations, non-3GPP access points, e.g., a WiFi access point, e.g., base station, data networks, servers, a hybrid 3GPP/cable network system including a common core network, e.g., a 5G core network, etc. Various embodiments are also directed to methods, e.g., method of controlling and/or operating a system or device, e.g., a communications system, a cable network system, a hybrid cellular and cable network system, a CMTS, a UE, a CM, a 5G core network, a 5G core network function component, etc. Various embodiments are also directed to machine, e.g., computer, readable medium, e.g., ROM, RAM, CDs, hard discs, etc., which include machine readable instructions for controlling a machine to implement one or more steps of a method. The computer readable medium is, e.g., non-transitory computer readable medium.

While various features have been explained in the context of an exemplary 5G system it should be appreciated that the features and embodiments are not limited to 5G and can be used with other systems, e.g., 4G systems. To the extent that devices described in this application using 5G terminology it is to be understood that the language is used to explain the invention and not to limit the application to 5G implements but the features can be used with other systems which have the same or similar functionality to the exemplary 5G components.

It is understood that the specific order or hierarchy of steps in the processes and methods disclosed is an example of exemplary approaches. Based upon design preferences, it is understood that the specific order or hierarchy of steps in the processes and methods may be rearranged while remaining within the scope of the present disclosure. The accompanying method claims present elements of the various steps in a sample order, and are not meant to be limited to the specific order or hierarchy presented. In some embodiments, one or more processors are used to carry out one or more steps of the each of the described methods.

In various embodiments each of the steps or elements of a method are implemented using one or more processors. In some embodiments, each of elements are steps are implemented using hardware circuitry.

In various embodiments nodes and/or elements described herein are implemented using one or more components to perform the steps corresponding to one or more methods, for example, performing authentication, identifying, generating a message, message reception, signal processing, sending, communicating, e.g., receiving and transmitting, comparing, negotiating, making a decision, determining and/or transmission steps. Thus, in some embodiments various features are implemented using components or in some embodiments logic such as for example logic circuits. Such components may be implemented using software, hardware or a combination of software and hardware. Many of the above described methods or method steps can be implemented using machine executable instructions, such as software, included in a machine readable medium such as a memory device, e.g., RAM, floppy disk, etc. to control a machine, e.g., general purpose computer with or without additional hardware, to implement all or portions of the above described methods, e.g., in one or more nodes. Accordingly, among other things, various embodiments are directed to a machine-readable medium, e.g., a non-transitory computer readable medium, including machine executable instructions for causing a machine, e.g., processor and associated hardware, to perform one or more of the steps of the above-described method(s). Some embodiments are directed to a device, e.g., a CMTS, a CM, user device such as a UE, a Wifi AP, a core device, a server, a communication node, etc., including a processor configured to implement one, multiple or all of the steps of one or more methods of the invention.

In some embodiments, the processor or processors, e.g., CPUs, of one or more devices, are configured to perform the steps of the methods described as being performed by the devices, e.g., communication nodes. The configuration of the processor may be achieved by using one or more components, e.g., software components, to control processor configuration and/or by including hardware in the processor, e.g., hardware components, to perform the recited steps and/or control processor configuration. Accordingly, some but not all embodiments are directed to a device, e.g., communications node such as a CMTS, with a processor which includes a component corresponding to each of the steps of the various described methods performed by the device in which the processor is included. In some but not all embodiments a device, e.g., communications node such as a CMTS, includes a component corresponding to each of the steps of the various described methods performed by the device in which the processor is included. The components may be implemented using software and/or hardware.

Some embodiments are directed to a computer program product comprising a computer-readable medium, e.g., a non-transitory computer-readable medium, comprising code for causing a computer, or multiple computers, to implement various functions, steps, acts and/or operations, e.g. one or more steps described above. Depending on the embodiment, the computer program product can, and sometimes does, include different code for each step to be performed. Thus, the computer program product may, and sometimes does, include code for each individual step of a method, e.g., a method of controlling a controller or node. The code may be in the form of machine, e.g., computer, executable instructions stored on a computer-readable medium, e.g., a non-transitory computer-readable medium, such as a RAM (Random Access Memory), ROM (Read Only Memory) or other type of storage device. In addition to being directed to a computer program product, some embodiments are directed to a processor configured to implement one or more of the various functions, steps, acts and/or operations of one or more methods described above. Accordingly, some embodiments are directed to a processor, e.g., CPU, configured to implement some or all of the steps of the methods described herein. The processor may be for use in, e.g., a communications device such as a controller or other device described in the present application.

Numerous additional variations on the methods and apparatus of the various embodiments described above will be apparent to those skilled in the art in view of the above description. Such variations are to be considered within the scope. Numerous additional embodiments, within the scope of the present invention, will be apparent to those of ordinary skill in the art in view of the above description and the claims which follow. Such variations are to be considered within the scope of the invention.

What is claimed is:

1. A communications method, the method comprising:
sending, from a network device to a cable modem termination system (CMTS), a QoS (Quality of Service) request requesting a desired level of QoS for a Protocol Data Unit (PDU) session for a user equipment device (UE), said QoS request including an IP address and port number used for communicating with the UE via a cable modem and said CMTS; and
recovering information, at the network device, from a QoS request result message received from the CMTS, said QoS request result message communicating a response to the QoS request.

2. The method of claim 1,
wherein said network device is a Non-3GPP Interworking Function (N3IWF) device; and
wherein said PDU session is a protocol data unit session over a logical connection between the UE and a data network which traverses the cable modem and the CMTS.

3. The method of claim 1,
wherein said network device is in a wireless network core; and
wherein the QoS request result message is based on a negotiation between a CMTS and a cable modem and
wherein the QoS request result message indicates a requested QoS level will be supported for the PDU session between the cable modem and the CMTS.

4. The method of claim 3,
wherein the QoS request further includes a requested level of QoS; and
wherein the QoS request result message indicates one of: i) request granted or ii) request failed.

5. The method of claim 3, further comprising:
prior to the network device sending the QoS request, operating the network core to receive a new PDU session establishment request corresponding to the UE; and
communicating security association information from the network device to the UE for the new PDU session along with an IP address and port number to be used for the new PDU session.

6. The method of claim 5, further comprising:
operating the wireless network core to communicate a PDU session establishment accept signal to the CMTS for delivery to the UE via the cable modem as part of establishing the PDU session.

7. The method of claim 6, further comprising:
operating the wireless network core to communicate QoS expectation information to the CMTS for delivery to the UE via the cable modem.

8. The method of claim 7 wherein the QoS expectation information is included in a grant result sent to the UE in an NAS (non-access stratum) message from the wireless network core.

9. The method of claim 7, wherein said the communicated QoS expectation information is applicable to UE decision making regarding a possible handoff of an ongoing voice session from a cellular wireless network to said PDU session.

10. The method of claim 9, further comprising:
operating the wireless network core to receive, from the CMTS, a handoff signal from the UE, said handoff signal indicating a decision by the UE to handoff to said PDU session.

11. A communications system comprising:
a cable modem termination system (CMTS); and
a network device configured to:
- send to the CMTS, a QoS (Quality of Service) request requesting a desired level of QoS for a Protocol Data Unit (PDU) session for a user equipment device (UE), said QoS request including an IP address and port number used for communicating with the UE via a cable modem and said CMTS; and
- recover information from a QoS request result message received from the CMTS communicating a response to the QoS request.

12. The communications system of claim 11,
wherein said network device is a Non-3GPP Interworking Function (N3IWF) device; and
wherein said PDU session is a protocol data unit session over a logical connection between the UE and a data network which traverses the cable modem and the CMTS.

13. The communications system of claim 11, further comprising:
a wireless network core in which said network device is located; and
wherein the QoS request result message is based on a negotiation between a CMTS and a cable modem and
wherein the QoS request result message indicates a requested QoS level will be supported for the PDU session between the cable modem and the CMTS.

14. The communications system of claim 13,
wherein the QoS request further includes a requested level of QoS; and
wherein the QoS request result message indicates one of: i) request granted or ii) request failed.

15. The communications system of claim 13, further comprising:
an Access and Mobility Management Function (AMF) included in said wireless network core configured to receive a new PDU session establishment request corresponding to the UE prior to the network device sending the QoS request; and
wherein the network device is further configured to communicate security association information to the UE for the new PDU session along with an IP address and port number to be used for the new PDU session.

16. The communications system of claim 15, wherein the network device is further configured to communicate a PDU session establishment accept signal to the CMTS for delivery to the UE via the cable modem as part of establishing the PDU session.

17. The communications system of claim 16, wherein the AMF is further configured to communicate QoS expectation information to the CMTS for delivery to the UE via the cable modem.

18. The communications system of claim 17 wherein the QoS expectation information is included in a grant result sent to the UE in an NAS (non-access stratum) message from the wireless network core.

19. The communications system of claim 18,
wherein said the QoS expectation information is applicable to UE decision making regarding a possible handoff of an ongoing voice session from a cellular wireless network to said PDU session; and
wherein the AMF is further configured to receive a handoff signal from the UE, said handoff signal indicating a decision by the UE to handoff to said PDU session.

20. A non-transitory computer readable medium including computer executable instructions which when executed by a processor of a network device of a communications system cause the network device to perform the steps of:
sending, to a cable modem termination system (CMTS), a QoS (Quality of Service) request requesting a desired level of QoS for a Protocol Data Unit (PDU) session for a user equipment device (UE), said QoS request including an IP address and port number used for communicating with the UE via a cable modem and said CMTS; and
recovering information, at the network device, from a QoS request result message received from the CMTS, said QoS result message communicating a response to the QoS request.

* * * * *